United States Patent [19]
Anderson et al.

[11] 3,876,608
[45] Apr. 8, 1975

[54] THERMOPLASTIC FILMS CONTAINING SPHERICAL INORGANIC PARTICLES OF 2 TO 10 MICRON SIZE

[75] Inventors: Jerrel Charles Anderson, Circleville, Ohio; Ralph Kingsley Iler, Wilmington, Del.

[73] Assignee: E. I. du Pont de Nemours and Company, Wilmington, Del.

[22] Filed: May 26, 1972

[21] Appl. No.: 257,238

[52] U.S. Cl.......... 260/40 R; 260/42.46; 260/42.49; 260/DIG. 35
[51] Int. Cl............................................. C08g 51/04
[58] Field of Search ......... 260/40 R, 75 T, DIG. 35, 260/42.46, 42.49

[56] References Cited
UNITED STATES PATENTS
3,221,226  11/1965  Kennedy et al. ............. 260/40 R X
3,366,597  1/1968  Fort ................................. 260/40 R
3,419,460  12/1968  Ure ..................................... 161/162

FOREIGN PATENTS OR APPLICATIONS
769,628  1/1972  Belgium
769,627  1/1972  Belgium Primary Examiner—Melvyn I. Marquis
Assistant Examiner—S. M. Person

[57]  ABSTRACT

Polymeric film having incorporated therein quantities of inert filler having substantially uniform particle size and an average particle size of at least 2 microns, the film being characterized by improved winding and optical properties.

10 Claims, No Drawings

THERMOPLASTIC FILMS CONTAINING SPHERICAL INORGANIC PARTICLES OF 2 TO 10 MICRON SIZE

BACKGROUND OF THE INVENTION

In the preparation of polymeric films, inert particles have previously been incorporated into the polymer to improve the winding characteristics of the finished films. However, difficulty has been encountered in the past in preparing filled films of this type that would exhibit excellent winding characteristics over a wide range of handling and processing conditions without depreciating the optical clarity of the film. Various combinations of filler materials and surface roughening treatment have been used, but none has been found entirely satisfactory.

SUMMARY OF THE INVENTION

The present invention provides a filled polymeric film having both improved winding and optical characteristics.

Specifically, the present invention provides a polymeric film having dispersed therein about from 5 to 300 parts per million of substantially spherical, inert, inorganic particles having an average particle size of at least 2 microns, at least 50% of the particles having a particle size within 1 micron of the average particle size.

Preferably, the inert particles consist of aluminosilicate molecular sieve and the film further comprises at least about 100 parts per million of inert material having a particle size of less than 1.0 micron.

DETAILED DESCRIPTION OF THE INVENTION

Thermoplastic materials which can be used in the present invention include polyesters such as polyethylene terephthalate, polyamides such as nylon 66 and nylon 6, polyolefins such as polypropylene and polyethylene, and vinyl polymers. Particularly preferred polymers include polyalkylene terephthalate polymers produced from the reaction product of terephthalic acid, or a dialkyl ester of terephthalic acid (especially dimethyl terephthalate) and glycols of the series $HO(CH_2)_nOH$ wherein n is an integer greater than 1 but not exceeding 10. Suitable glycols include ethylene glycol, trimethylene glycol, hexamethylene glycol, cyclohexane dimethanol and the like. Other functional compounds which can be reacted with terephthalic acid or with a dialkyl ester of terephthalic acid to produce linear polyester types, include p-xylene glycol, hydroquinone, and cyclic glycols. Other polymers which can be used include polyalkylene terphthalate-containing modifiers such as dibasic acids including among others, isophthalic acid, sebacic acid, adipic acid, sulfonated derivatives and the like. One polyester particularly preferred in the invention is polyethylene terephthalate having been oriented by stretching at least 2.5 times in each of two mutually perpendicular directions in the plane of the film.

The additives required in accordance with the instant invention are inert, inorganic particles having a substantially uniform particle size. The particles should have a three-dimensional, or substantially spherical configuration, as opposed to platelet particles.

A wide variety of inert materials of uniform spherical configuration can be prepared from various inorganic oxides as described in the copending, coassigned application of Iler and McQueston, (IPD-14) Ser. No. 242,039, filed Apr. 7, 1972, hereby incorporated by reference. Preferred materials for use in the present invention include refractory metal oxides.

Inert particulate additives of the required particle uniformity that have been found especially satisfactory for use in the instant invention are aluminosilicate molecular sieves. These sieves are zeolites or similar materials with small pores connected by openings of precisely uniform size. Synthetic zeolites of the required configuration can be prepared by forming a silica gel in the presence of alkali silicate and aluminate. The system is digested several hours at elevated temperatures in the liquid phase to cause crystallization. The zeolite is then separated and dried. The molecular sieves are generally spherical in shape as opposed to having a platelet configuration, and are commercially available from Union Carbide Corporation as "Linde 13X" $Na_{86}$-$[(AlO_2)_{86}(SiO_2)_{106}] \cdot XH_2O$ and "Linde 4A" $Na_{12}$-$[(AlO_2)_{12}(SiO_2)_{12}] \cdot 27H_2O$. The preferred aluminosilicate molecular sieves differ from clays of the kaolin group in at least two basic respects. The chemical composition is distinct, the clays consisting essentially of $Al_2(OH)_4Si_2O_5$, and the clays having a platelet configuration, in contrast to the substantially spherical configuration of the present inert particles.

The inert particles are incorporated in quantities of about from 5 to 300 ppm. It has been found that less than 5 ppm of the additive has little or no beneficial effect on the handling properties of the finished film product. The addition of greater than 300 ppm not only fails to further improve handling characteristics, but tends to depreciate the excellent optical properties of the present films. In general, about from 20 to 75 ppm of inert additive has been found particularly satisfactory for polyester films.

The average size of particles incorporated should be at least about 2 microns and less than about 10 microns. While the maximum permissible particle size will, of course, vary with the thickness of the film, average particle sizes of about from 2 to 4 microns have been found particularly satisfactory for most film thicknesses. In addition, the inert particles according to the present invention should exhibit a uniform size, with at least 50% of the particles having a size within one micron of the average. The narrow particle size distribution permits obtaining a population density of large asperities that permits good winding performance while using very small concentrations of additive.

The particles should be three-dimensional, or substantially spherical in configuration. The preferred molecular sieve particles, for example, are generally octahedral and nearly spherical in shape and are, therefore, more efficient at disrupting the film surface topography than particles of similar chemical composition but having platelet physical configuration. The voids formed around the spherical particles in the course of biaxial orientation are generally smaller than those formed around regular additive particles, resulting in overall better optical characteristics than other particles of a similar size.

The films of the present invention preferably further comprise at least 100 parts per million of inert material having a particle size of less than 1.0 microns and preferably less than 0.5 micron. These smaller inert particles include those materials which are insoluble in and do not react with the polyester in which they are to be incorporated. Representative materials which can be incorporated include silica, kaolin, china clay, aluminosilicates, diatomaceous earth, carbon black and calcium phosphates such as calcium pyrophosphate and tribasic calcium phosphate. Of these, silicon dioxide, tribasic calcium phosphate having the formula $3Ca_3(PO_4)_2 \cdot Ca(OH)_2$ and calcium hydrogen phosphate having the chemical formula $CaHPO_4$ particularly preferred, since the refractive indices of these materials are especially compatible with the preferred polyester materials. The incorporation of the smaller particles reduces the coefficient of friction of the film and thereby results in the reduction of "blocking" of the film.

The particle sizes required in the additives of the present invention refer to the maximum dimension of the particle. Measurement of particle sizes can be done by those procedures described in detail in the copending application of Anderson et al., Ser. No. 151,899, filed June 10, 1971, now abandoned and assigned to the assignee of the present application. As will be evident, the present particles, being substantially spherical, do not require those correction factors required for platelet particles.

The required quantities of inert material can be added to the film-forming material at any point prior to the extrusion of the polymer as a film. With the preferred polyester materials, it has been found particularly convenient to add the inert particles as a slurry, e.g., in ethylene glycol, after the ester interchange reaction in which the monomers are formed which polymerize to form the polyester, the inert additives being added together with the catalysts required for the polymerization.

In addition to the quantities of uniform, inert particles required in the instant invention and the preferred quantities of smaller inert particles, additional additives of varying particle size can be incorporated to the extent that they do not markedly depreciate the properties of the present films. For example, up to 5,000 parts per million of particles of less than 0.5 micron can be added.

The films of the present invention exhibit exceptional winding performance in combination with excellent clarity and other optical characteristics.

As will be evident to those skilled in the art, the films of the present invention can be used alone or in conjunction with various surface modifications. Such surface modification can include, for example, application or incorporation of stearic acid or waxes or treatment for application of silica nodules as described in detail in copending, coassigned application Ser. No. 239,321 of Anderson and Heffelfinger (F-2140) filed Mar. 29, 1972. The silica treatment is particularly beneficial in reducing the surface coefficient of friction, in much the same manner as the inert material previously referred to having a particle size of less than one micron.

The invention is further illustrated by the following specific examples.

EXAMPLE 1

A biaxially oriented, heat-set polyethylene terephthalate film is prepared having incorporated therein 150 parts per million of aluminosilicate molecular sieve having an average particle size of about 2.9 microns, as well as 2,000 parts per million of fumed silica powder. The molecular sieve particle size distribution is such that greater than 50% of the particles deviated from the average by less than 1 micron.

Ethylene glycol slurries of "Linde 13X" alumina silicate molecular sieve and "Cabot L5" silicon dioxide are prepared at concentrations of 12.6% and 20.0% solids, respectively. The slurries are separately sand milled and mixed in the required quantities with 300 milliliters of ethylene glycol, after which 320 grams of crushed dihydroxyethyl terephthalate monomer are added. The glycol is distilled away at atmospheric pressure. The molten monomer is then polymerized at 285°C. at a pressure of about 0.5 millimeters of mercury. The resulting polyethylene terephthalate is cooled, powdered and dried.

The dried polymer powder is melt pressed at 285°C. into films having a thickness of about 0.010 to 0.015 inch. The films are biaxially oriented by stretching at 95°C., 3.5X by 3.5X, and then heat-set under restraint at 210°C.

A control sample is prepared by substantially the same procedure as above, except that the aluminosilicate molecular sieve is not added and the film is stretched 3.3X by 4.0X and heat-set at 207°C.

If the film of the present invention and the control sample are evaluated for winding and optical characteristics, the film of the present invention, compared to the control sample, will be found to exhibit exceptional winding performance and a satisfactorily high degree of lateral slip, permitting the formation of smooth rolls. In addition, the depreciation of the clarity and other optical properties in the films of the present invention due to the presence of the larger molecular sieve particles is minimal.

EXAMPLE 2

A polyethylene terephthalate film was prepared having incorporated therein 50 parts per million of "Linde 13X" molecular sieve powder having an average particle size of 2.9 microns and 800 parts per million of tricalcium phosphate having an average particle size of less than .75 microns. The molecular sieve exhibited a particle size distribution such that greater than 50% of the particles fall within 1 micron of the average.

Both the molecular sieve and the tricalcium phosphate were prepared as 25% slurries of ethylene glycol and sand milled. The sand milling of the molecular sieve breaks up any agglomerations of particles, and the sand milling of the tricalcium phosphate reduces it to the indicated particle size.

Ethylene glycol slurries of the molecular sieve and tricalcium phosphate were fed at a controlled rate to be combined with dihydroxyethyl terephthalate monomer in the indicated amounts. the monomer was then polymerized and extruded onto a cool quench drum, oriented 3.27X in the machine direction at a temperature of 89.5°C. and 4.4X in the transverse direction at a temperature of 90°–135°C. The film was then heat-set at a temperature of 208°C.

A control film was prepared using the same technique, except that the molecular sieve was not added to the reaction mixture.

The film of the present invention was tested for roll forming characteristics, and was found to form rolls having uniform hardness, smooth ends, soft sheet impressions and a uniformly bright and silvery appearance. Under the same roll winding conditions, the control film exhibited rougher ends, hard sheet impressions, nonuniform hardness, highly visible bands of gauge irregularity and a soiled appearance caused by a light interference pattern within the rolls.

The winding performance of the film of the present example and the control sample were tested, and it was found that the films of the present invention could be wound more than twice as fast as the control sample without telescoping. In view of the excellent winding characteristics and the addition of large asperities, the films of the present invention exhibited excellent optical properties, these being depreciated only somewhat over the control example. The clarity of the control was found to be 83.6% while that of the present invention was 81.9%. The percent haze of the films of the present invention increased to 3.1% from 2.5% in the control sample.

We claim:

1. A polymeric thermoplastic film having dispersed therein about 5 to 300 parts per million of substantially spherical, inert, inorganic particles having an average particle size of about 2 to 10 microns, at least 50% of the particles having a particle size within 1 micron of the average particle size.

2. The polymeric film of claim 1 wherein the inert particles consist essentially of refractory metal oxide or aluminosilicate molecular sieve.

3. The film of claim 2 wherein the inert particles have an average particle size of about 2 to 4 microns.

4. The film of claim 1 also having dispersed therein at least about 100 parts per million of inert material having a particle size of less than 1.0 micron.

5. The film of claim 4 wherein the inert material having a particle size of less than 1.0 micron is at least one of silicon dioxide, a tribasic calcium phosphate of the formula $3Ca_3(PO_4)_2 \cdot Ca(OH)_2$, or calcium hydrogen phosphate.

6. The film of claim 4 wherein the inert particles having an average particle size of about 2 to 10 microns consist essentially of aluminosilicate molecular sieve.

7. The film of claim 4 wherein the inert particles having an average particle size of about 2 to 10 microns consist essentially of refractory metal oxide.

8. The film of claim 4 wherein the polymeric film is a polyester, polyamide, polyolefin, or vinyl polymer film.

9. The film of claim 4 wherein the polyester is polyethylene terephthalate.

10. A polymeric film of claim 1 having bonded to the surface thereof a multiplicity of discrete nodules of silicon dioxide.

* * * * *

PO-1050
(5/69)

UNITED STATES PATENT OFFICE
CERTIFICATE OF CORRECTION

Patent No. 3,876,608      Dated April 8, 1975

Inventor(s) Jerrel Charles Anderson and Ralph Kingsley Iler

It is certified that error appears in the above-identified patent and that said Letters Patent are hereby corrected as shown below:

Column 3, line 8, "$CaHPO_4$ particularly" should read -- $CaHPO_4$ are particularly --.

Column 4, line 54, "the" should read -- The --.

Column 6, line 21 (first line of claim 9), "claim 4" should read -- claim 8 --.

Signed and Sealed this second Day of September 1975

[SEAL]

Attest:

RUTH C. MASON
Attesting Officer

C. MARSHALL DANN
Commissioner of Patents and Trademarks